(12) United States Patent
Kavounas

(10) Patent No.: US 7,924,268 B2
(45) Date of Patent: Apr. 12, 2011

(54) CLEARING POTENTIALLY INADVERTENT ENTRIES IN ELECTRONIC DEVICE

(75) Inventor: Gregory T. Kavounas, Kirkland, WA (US)

(73) Assignee: Frobisher Fulton PA L.L.C., Dover, DE (US)

( * ) Notice: Subject to any disclaimer, the term of this patent is extended or adjusted under 35 U.S.C. 154(b) by 894 days.

(21) Appl. No.: 11/270,972

(22) Filed: Nov. 10, 2005

(65) Prior Publication Data

US 2007/0118505 A1 May 24, 2007

(51) Int. Cl.
*G06F 3/02* (2006.01)
(52) U.S. Cl. ....................................................... 345/169
(58) Field of Classification Search .................. 345/156, 345/168–172; 455/565; 341/22–34
See application file for complete search history.

(56) References Cited

U.S. PATENT DOCUMENTS

| | | | |
|---|---|---|---|
| 4,859,100 A | 8/1989 | Carlson et al. | |
| 5,987,311 A | 11/1999 | Phillips | |
| 5,991,396 A * | 11/1999 | Salm et al. | 715/860 |
| 5,995,844 A | 11/1999 | Fukuda | |
| 6,567,672 B1 | 5/2003 | Park et al. | |
| 6,630,927 B2 | 10/2003 | Sherman et al. | |
| 6,731,312 B2 | 5/2004 | Robbin | |
| 6,867,763 B2 * | 3/2005 | Griffin et al. | 345/168 |
| 6,947,771 B2 | 9/2005 | Guo et al. | |
| 7,099,684 B2 | 8/2006 | Cowsky et al. | |
| 7,256,769 B2 * | 8/2007 | Pun et al. | 345/171 |
| 7,382,359 B2 * | 6/2008 | Griffin | 345/169 |
| 2002/0190962 A1* | 12/2002 | Miura | 345/173 |
| 2004/0204123 A1* | 10/2004 | Cowsky et al. | 455/565 |
| 2005/0116840 A1* | 6/2005 | Simelius | 345/168 |

FOREIGN PATENT DOCUMENTS

JP 01100619 A * 4/1989

* cited by examiner

*Primary Examiner* — Chanh Nguyen
*Assistant Examiner* — Adam J Snyder
(74) *Attorney, Agent, or Firm* — Fitch Even Tabin & Flannery

(57) ABSTRACT

Electronic devices, software and methods for a host electronic device such as a mobile phone, PDA, player, etc. In some embodiments, a criterion is used to determine whether a manual entry by the user was intended. If not, the entry is cleared.

35 Claims, 4 Drawing Sheets

SET OF COMPONENTS OF HOST ELECTRONIC DEVICE

HOST DEVICE IS
WIRELESS TELEPHONE

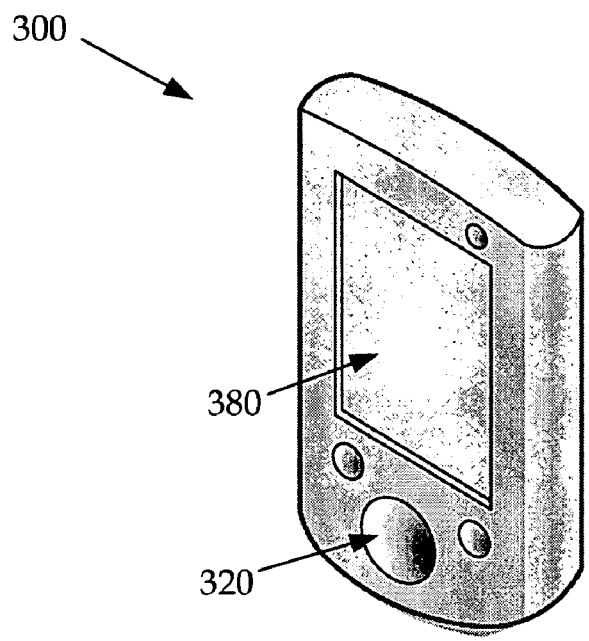
FIGURE 3  *HOST DEVICE IS PDA*
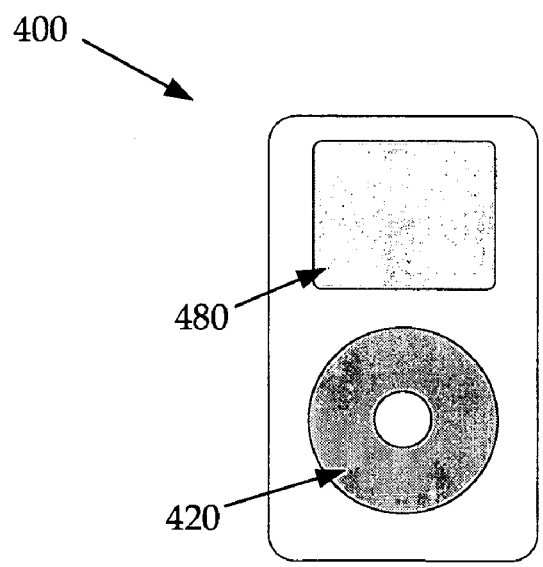
*HOST DEVICE IS PLAYER*
FIGURE 4

600

| TIME | USER ACTION | EMBODIMENT OF INVENTION: | SCREEN SHOWS | WHAT USER SEES (WHEN LOOKING) |
|---|---|---|---|---|
| T1 | RESETS DEVICE | | (empty) | (empty) |
| T2 | STOPS LOOKING AT DEVICE | | (empty) | |
| T3 | NOT LOOKING; INADVERTENT ENTRY ("4") | | 4 | |
| T4 | NOT LOOKING; | STARTS TIMER TO SEE IF "4" INADVERTENT | 4 | |
| T5 | NOT LOOKING; INADVERTENT ENTRY ("1") | STOPS TIMER | 41 | |
| T6 | NOT LOOKING; | STARTS TIMER TO SEE IF "1" INADVERTENT | 41 | |
| T7 | NOT LOOKING; | TIMER TIMEOUT; SO, "1" INADVERTENT; CLEARS "1" | 4 | |
| T8 | NOT LOOKING; | CLEARED "1"; SO, "4" ALSO INADVERTENT; CLEARS "4" | (empty) | |
| T9 [AS T1] | LOOKS AT DEVICE; IT IS READY | | (empty) | (empty) |
| T10 | [ENTERS AS INTENDED] | | 1206 | 1206 |

FIGURE 6  *SAMPLE CLEARING OPERATIONS*

CLEARING POTENTIALLY INADVERTENT ENTRIES IN ELECTRONIC DEVICE

BACKGROUND

1. Field of the Invention

The present invention is related to the field of portable electronic devices such as cellular telephones, personal digital assistants (PDAs), players such as music players and game players, and the like, and more specifically to such devices that have an interface for manual entries by the user, and further features for reacting to user entries that were potentially inadvertent.

2. Description of the Related Art

Portable electronic devices such as cell phones, personal digital assistants, players, and the like are proliferating. Increasingly, people carry them on their persons for ease of use.

Many of these devices have interfaces for the user to make entries. A typical such interface is a keypad. For example, personal digital assistants have keypads for entering characters, along with other controls. For another example, cellular telephones ("cell phones" or "mobile telephones") have keypads for dialing numbers, along with activation keys (that effectuate dialing and other functions). Other devices, such as iPOD-type players, have rotary interfaces, and so on.

A problem with such interfaces is that entries can be received inadvertently, from movements of the user. For example, when someone wears a cell phone on their person, they might later discover from the screen that certain buttons have been pressed inadvertently. They must then clear the inadvertent entries. It is even more of a problem when an activation key has been pressed inadvertently. For example, if it is a telephone, an inadvertently dialed number has been called.

Some solutions have been proposed for preventing inadvertently manual entries. For example, U.S. Pat. No. 4,859,100 provides a keypad with partitions between the keys. This can require more space to implement the keypad.

Others of these solutions have required users to take more steps. For example, a manual cover over a keypad can be opened. Or a soft lock feature can be implemented, where a password needs to be dialed first. Examples of these include U.S. Pat. Nos. 6,630,927, and 5,987,311.

Users can grow impatient when they are required to take more steps, and even neglect to take them. After all, taking more steps is just what they had to do to clear the inadvertent entries anyway.

BRIEF SUMMARY

The present invention overcomes these problems and limitations of the prior art.

Generally, the present invention provides electronic devices, software and methods for electronic devices. In some embodiments, manual entries by the user are cleared, if it becomes determined that they were potentially inadvertent.

Some embodiments offer the advantage that such entries are cleared without the user needing to take more steps. In fact, sometimes clearing can be discreet, without the user even finding out.

The invention will become more readily apparent from the following Detailed Description, which proceeds with reference to the drawings, in which:

BRIEF DESCRIPTION OF THE DRAWINGS

FIG. 3 is a perspective diagram of a Personal Digital Assistant hosting the set of components of FIG. 1 according to embodiments.

FIG. 4 is a perspective diagram of an electronic player hosting the set of components of FIG. 1 according to embodiments.

FIG. 6 is a table for explaining a sample operation of the set of components of FIG. 1 according to an embodiment.

DETAILED DESCRIPTION

As has been mentioned, the present invention provides devices, software and methods for electronic devices. The invention is now described in more detail.

Figure 1:
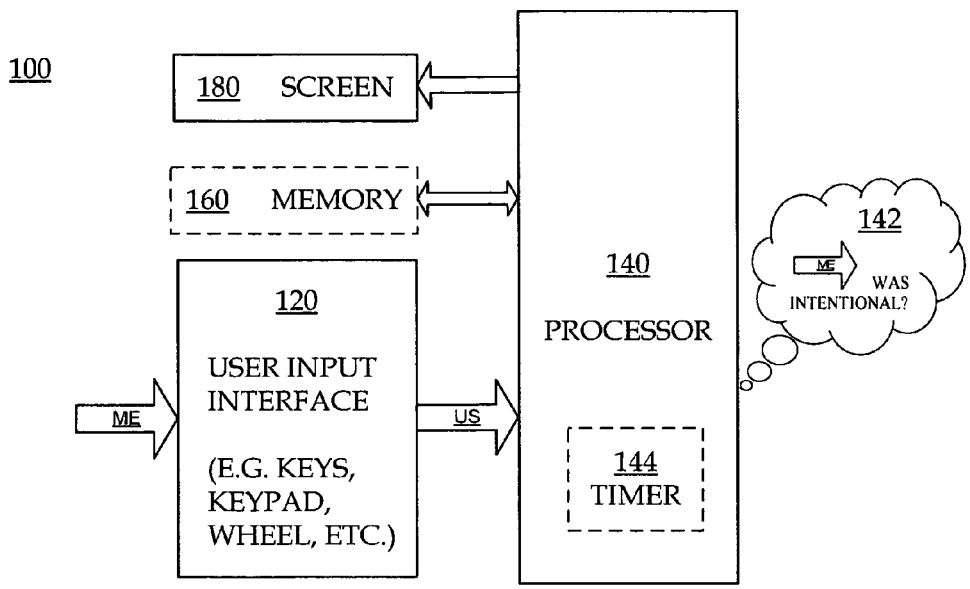
FIG. 1 is a block diagram of a set of operational components of a host electronic device according to embodiments.

Referring now to FIG. 1, a block diagram is now described for a set 100 of operational components of a host electronic device (not shown in FIG. 1), which is made according to embodiments. A host electronic device having components 100 can be implemented in any number of applications, as will be seen from the examples below.

Set 100 includes a user interface 120. Interface 120 is adapted to receive manual entries ME by movements of a user. In addition, interface 120 is adapted to generate electrical user signals US responsive to receiving entries ME. User signals US are designed to be applied to corresponding regular uses of the host device, such as for entering data, activating the device, and so on.

Interface 120 can be made any number of ways, examples of which will be described in more detail below. In many embodiments, interface 120 has one or more pushbuttons. In some embodiments, a number of the pushbuttons can be arranged in a keypad. In some embodiments, interface 120 includes a joystick. In some embodiments, interface 120 includes a wheel. Sometimes the wheel can be turned to scroll quickly through possible entries.

Set 100 also includes a processor 140, provided as per the invention. Processor 140 receives via interface 120 user signals US that correspond to the manual entries ME of the user. In some embodiments it is also advantageous but not necessary that processor 140 is also the same processor as the one provided for implementing the regular functions of the host device, e.g. in response to regularly receiving the user signals US from interface 120. Whether a processor as per the invention, or also implementing the regular functions of the host device, processor 140 can be made in any way known in the art. Examples only include a general-purpose processor that is specially programmed, or a dedicated processor, implemented in one or more units. The end result for processor 140 is a microcontroller, or a microprocessor, or a Digital Signal Processor (DSP), or a Floating Point Gate Array, or an Application Specific Integrated Circuit (ASIC), etc.

Processor 140 determines whether manual entry ME was intentional. The determination is depicted conceptually by a thought shape 142 in FIG. 1. If it is determined that indeed manual entry ME was intentional, user signals US are applied to their regular use for the host device.

Processor 140 of course cannot read the mind of the user, to determine whether their movement that resulted in manual entry ME was intentional or not. Therefore, processor 140 makes this determination by any number of criteria. There can be many such criteria according to the invention. In a number of embodiments, the criteria are chosen so that they infer the probable mindset of the user at the time of the movement that resulted in the manual entry ME.

One such criterion is that enough time passes from a manual entry ME, without anything else happening. If so, the manual entry ME can be deemed inadvertent, not intentional, and it can be inferred that the user did not have an intention to actually use the device. There are a number of ways of implementing such a criterion.

In some embodiments, processor 140 includes an optional timer 144, which can determine whether a timeout period expires. The timeout period can be measured starting from any number of events, such as when the entry ME was made, or the user signal US was generated. A good duration for the timeout period would be 30 seconds.

Additional extensions of the invention include the feature and method of setting the duration of the timeout period, or adjusting it. In some embodiments, the user can be prompted to adjust the timeout duration. In some embodiments, the user can even disable the feature.

In yet more embodiments, the host device can learn from habitual behaviors of the user, and adjust the duration. One objective of such automatic adjusting can be for the operation of the invention to remain discreet and unobtrusive.

Another such criterion is that a previous entry ME was deemed inadvertent. The rationale is that the user can make a number of inadvertent entries ME; if the last one is found inadvertent, then all the prior ones can be so found, since the last reset. So, they can be cleared all at once, or equivalently one at a time. It should be noted from this example is that different criteria can be applied to different entries from a group of even successive entries.

One more such criterion is that a number of successive entries are the same, especially if they are the last received. For example, a pushbutton may be pushed for a long time, causing the same entry to be made a number of times. That can be deemed unintentional in a number of instances, such as when a telephone number is to be dialed.

Yet one more criterion can be to request confirmation. This is particularly advantageously applied where the first regular use is to activate the device, beyond merely dialing numbers. Activating could be for the host device to generate a wireless transmission, which can encode a telephone number that is to be dialed, or a network address that is to be accessed. The confirmation can be by issuing another prompt to the user and so on.

Moreover, criteria can be made by combining one or more of the above criteria. For example, when two or more similar entries are received successively, a timeout period can be waited for. Further, since these are more likely inadvertent than a single entry, the duration can be shortened, and so on.

Regardless of how a manual entry ME is deemed inadvertent, processor 140 can clear its corresponding user signal US. Clearing is such that user signal US is prevented from being applied to the regular use. Clearing can be further implemented in a number of additional ways, such as described later in this document.

In some embodiments, set 100 is adapted to perform a number of additional operations before clearing the entries that have been deemed inadvertent. For example, it can issue a warning prompt to the user prior to clearing, to the effect that clearing is impending. The prompt could give a deadline for the user to react, such as by making another entry. If not, clearing can be performed responsive to the deadline expiring. The deadline can be expressed as a countdown.

Set 100 also optionally includes a memory 160. Memory 160 may be implemented in any way known in the art for such host electronic devices.

In some embodiments, processor 140 stores its own program to execute. In other embodiments, at least a portion of its program is stored in memory 160. In some embodiments, memory 160 provided for storing the programs of processor 140 is also the same memory as the one provided for implementing other functions of the host device.

In addition, in some embodiments, memory 160 can store parameters relating to operation of the invention. For example, memory 160 can store a record corresponding to the first manual entry. When the first signal is cleared, however, the record is erased from the memory.

Set 100 also optionally includes a screen 180 for viewing by the user. Screen 180 may be implemented in any way known in the art for such host electronic devices.

In some embodiments, screen 180 can show images corresponding to the manual entries ME received via interface 120. When the first signal is cleared, however, the images are erased from screen 180.

In some of those embodiments, screen 180 can also convey operations of the invention. For example, it can convey prompts that an entry is going to be cleared, and that the user should react. The prompt can be that the shown image is flashing, it can include a countdown, and so on.

The host device (not shown in FIG. 1) for set 100 of components can be implemented in any number of ways for any number of functions. Some non-limiting examples are now described, to demonstrate the wide array of applications.

Figure 2:
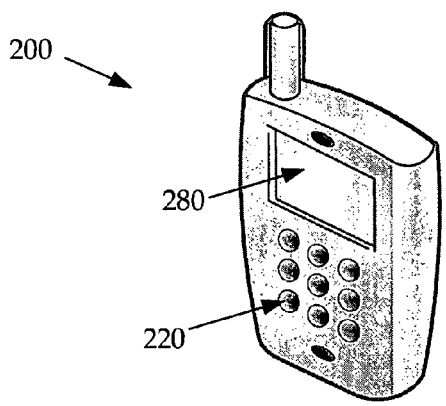
FIG. 2 is a perspective diagram of a wireless cellular telephone hosting the set of components of FIG. 1 according to embodiments.

FIG. 2 is a perspective diagram of a wireless cellular telephone 200. Telephone 200 is the host electronic device for set 100 of the components of FIG. 1, according to embodiments.

Telephone 200 has an interface 220, which includes a keypad with pushbuttons. Interface 220 operates similarly to the above-described interface 120. Telephone 200 also has a screen 280 similarly to the above-described screen 180. In some embodiments, the user's manual entries that are received in interface 220 are echoed in screen 280, by corresponding images.

Telephone 200 also includes a processor (not shown) similar to processor 140 of set 100, or is otherwise capable of performing methods of the invention, or both. This way telephone 200 can determine whether some of the manual entries in interface 220 were inadvertent, and if so clear them.

FIG. 3 is a perspective diagram of a Personal Digital Assistant (PDA) 300. PDA 300 is the host electronic device for set 100 of the components of FIG. 1, according to embodiments.

PDA 300 has an interface 320, which can include pushbuttons and/or other controls. Interface 320 operates similarly to the above-described interface 120. PDA 300 also has a screen 380 similarly to the above-described screen 180. In some embodiments, the user's manual entries that are received in interface 320 are echoed in screen 380, by corresponding images.

PDA 300 also includes a processor (not shown) similar to processor 140 of set 100, or is otherwise capable of performing methods of the invention, or both. This way, PDA 300 can determine whether some of the manual entries in interface 320 were inadvertent, and if so clear them.

FIG. 4 is a perspective diagram of an electronic player 400. Player 400 is the host electronic device for set 100 of the components of FIG. 1, according to embodiments. Player 400 can be, for example, an electronic music player, such as an MP3 music player. Or player 400 can be a game playing device, and so on.

Player 400 has an interface 420, which can include a wheel, pushbuttons, and so on. Interface 420 operates similarly to the above-described interface 120. Player 400 also has a screen 480 similarly to the above-described screen 180.

Player 400 also includes a processor (not shown) similar to processor 140 of set 100, or is otherwise capable of performing methods of the invention, or both. This way, player 400 can determine whether some of the manual entries in interface 420 were inadvertent, and if so clear them.

Moreover, methods are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between methods in this description, and the method of operating a computing machine such as electronic device 100.

This description relates both to methods in general, and also to steps for operating a device and for processing electrical or other physical signals to generate other desired physical signals.

Programs are additionally included in this description, as are methods of operation of the programs. A program is generally defined as a group of steps leading to a desired result, due to their nature and their sequence. A program is usually advantageously implemented as a program for a computing machine, such as a general-purpose computer, a special purpose computer, a microprocessor, etc.

Storage media are additionally included in this description. Such media, individually or in combination with others, have stored thereon instructions of a program made according to the invention. A storage medium according to the invention is a tangible computer-readable medium, such as a memory, and is read by the computing machine mentioned above.

Performing the steps or instructions of a program requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software. This is not necessary, however, and there may be cases where modules are equivalently aggregated into a single program with unclear boundaries. In any event, the software modules or features of this description may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

It will be appreciated that some of these methods may include software steps which may be performed by different modules of an overall parts of a software architecture. For example, data forwarding in a router may be performed in a data plane, which consults a local routing table. Collection of performance data may also be performed in a data plane. The performance data may be processed in a control plane, which accordingly may update the local routing table, in addition to neighboring ones. A person skilled in the art will discern which step is best performed in which plane.

An economy is achieved in the present document in that a single set of flowcharts is used to describe both programs, and also methods. So, while flowcharts are described in terms of boxes that depict operations, they can mean both method and programs.

For this description, the methods may be implemented by machine operations. In other words, embodiments of programs are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 5:
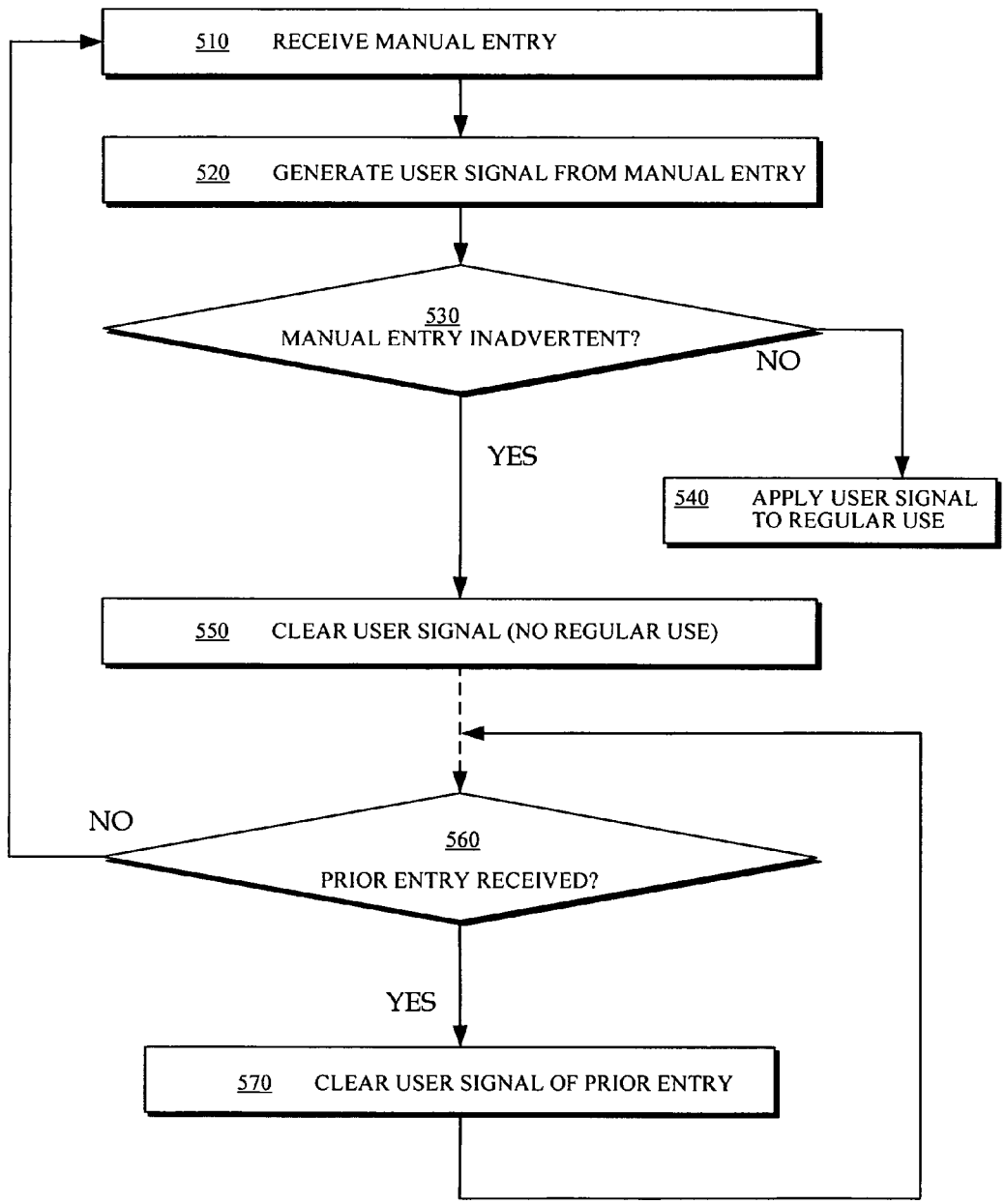
FIG. 5 is a flowchart illustrating method according to embodiments.

Referring now to FIG. 5, a flowchart 500 is used to illustrate a method according to another embodiment of the invention. The method of flowchart 500 may also be practiced by set 100, and any electronic device that hosts set 100, such as telephone 200, PDA 300, player 400, and so on.

According to an operation 510, a manual entry ME is received from a user. This can be in an interface 120 as described above, and could be inadvertent, meaning not intended by the user.

According to a next operation 520, a user signal US is generated from manual entry ME. This can be from interface 120 as described above. As also per the above, user signal US is intended for a regular use by the host device, if the entry is intended.

According to a next operation 530, it is determined whether manual entry ME was inadvertent. In other words, whether it was performed according to a corresponding intention of the user. This determining is performed according to one or more criteria, such as described above.

If at operation 530 it is determined that manual entry ME was intended, then in some embodiments according to a next operation 540, the user signal is applied to the regular use. This means that the host device operates regularly form the manual entry ME.

If at operation 530 it is determined that manual entry ME was inadvertent, then in some embodiments according to a next operation 550, the user signal US is cleared. This means that it is not applied to the regular use described in connection with operation 540. Clearing can be performed in a number of ways, such as described above. In addition, operations can be performed to warn the user that clearing is impending, such as described above.

According to an optional operation 560, it is inquired whether a prior entry has been received. It is preferred that all prior such entries are counted since the last reset activity, which returned the host electronic device to a standby status. If no prior entry has been received, then execution returns to operation 510.

If at operation 560 a prior entry has been received, then according to an optional next operation 570, the prior entry and/or its user signal is cleared. Then execution can return to operation 560, to clear additional prior entries.

FIG. 6 is a table 600 for explaining a sample operation of set 100 of the components of a host device, according to an embodiment of flowchart 500. Table 600 has rows showing successive time entries, and columns showing what happens during those times. In the second column the user action is shown, which could be inadvertent. In the third column, the action of an embodiment of the invention will appear. In the next column, in dashed lines, there is shown what the screen of the host device shows. The dashed lines are because the user does not see that, unless they are looking at the screen. The final column shows the screen, at times that the user is actually looking. These show blanks, for when the user is not looking.

At a time T1, the user activated the host device, e.g. by turning it on, or reset it from using it. In these instances, the screen could show nothing, or a welcome message, which the user could see as they might be looking.

At a time T2 shortly after time T1, the user stops looking at the screen of the host device, and does other things. The screen could show nothing, or a standby message, indicating the readiness to use the host device.

At a later time T3 the user inadvertently makes a movement, which results in an inadvertent manual entry. Here pushbutton "4" has been pushed, and the screen shows it. The user, however, does not see it, because they are not looking.

At a later time T4 the user does nothing with the device, whose screen continues to show the first inadvertent entry ("4"). The host device does not know whether the "4" is intended or inadvertent, and needs to develop a criterion. So, it starts a timer.

At a later time T5 the user inadvertently makes another movement, which results in another inadvertent manual entry. Here pushbutton "1" has been pushed, and the screen shows it, along with the "4". The user, however, does not see it, because they are not looking. At this point, the host device still does not know whether the "4" was intended or inadvertent, and does not know about the "1". For all it knows, the "1" could be intended, and therefore so was the "4", so it stops the timer.

At a later time T6 the user still does nothing with the device, whose screen continues to show the inadvertent entries ("41"). The host device again starts the timer, to develop a criterion, such as for the "1".

At a later time T7, while the user is still not looking, the timer times out. It is therefore determined that the "1" was inadvertent, and it is cleared. It is also erased from the screen and from any memory.

At a time T8, while the user is still not looking, it is determined that, since the "1" was inadvertent, so was the "4" before it. Therefore the "4" is also cleared. Accordingly, all digits have been cleared up to the last reset of time T1. The action of T8 can occur before, after or concurrently with T7. While only two inadvertent entries are shown in table 600, that is by way of example and not of limitation.

At a later time T9, the user looks again at the screen. What they see is the regular standby message, such as at time T2. They may be unaware that they made inadvertent entries, and that the host device cleared them.

At a later time T10, the user uses the host device, by making entries as intended. For example, they could be dialing a telephone number.

A difference should be observed over the prior art. Without the embodiment of the invention of this example, when at T9 the user looked again, they would have seen instead the screen of time T6. Then they would have to take an extra step to clear it.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and sub-combinations, which are regarded as novel and non-obvious. Additional claims for other combinations and subcombinations of features, functions, elements and/or properties may be presented in this or a related document.

What is claimed is:

1. A mobile electronic device comprising:
   a user interface adapted to generate user signals in response to receipt of manual entries at the user interface wherein a long duration manual entry results in generation of a number of user signals;
   a processing device adapted to apply a user signal to an associated data entry, to apply a most recent user signal to a most recent data entry in response to generation of the most recent user signal, to measure a time lapse since generation of the most recent user signal during which a subsequent user signal is not generated, to compare the time lapse to a timeout period, and to clear the most recent data entry in response to the time lapse exceeding the timeout period; and
   wherein the processing device is further adapted to measure a second time lapse since clearing the most recently generated data entry during which a user signal is not generated, to compare the second time lapse to a second timeout period, and to clear a data entry associated with a user signal generated before the most recent user signal in response to the second time lapse exceeding the second timeout period.

2. The mobile electronic device of claim 1 wherein the data entries are a sequence of data entries.

3. The mobile electronic device of claim 2 wherein the sequence of data entries comprises a sequence of identical data entries.

4. The mobile electronic device of claim 1 wherein the processing device is adapted to adjust at least one of the timeout periods according to habitual use of the mobile electronic device.

5. The mobile electronic device of claim 1 further comprising a memory adapted to store a record corresponding to the user signal wherein the record is cleared from the memory when the data entry is cleared.

6. The mobile electronic device of claim 1 further comprising a screen adapted to display an image corresponding to the data entry wherein the image is cleared from the screen in response to clearance of the data entry.

7. A mobile electronic device comprising:
a user interface adapted to generate user signals in response to receipt of manual entries at the user interface; and
a processing device adapted to receive consecutively generated user signals, to collectively store the generated user signals, and to clear a sequence of identical user signals of the collectively stored user signals beginning with a most recently generated user signal before clearing an earlier generated user signal, the processing device adapted to clear one user signal of the sequence of identical user signals at a time in response to the sequence of identical user signals exceeding a predetermined number of identical user signals.

8. The mobile electronic device of claim 7 further comprising a memory adapted to store a record corresponding to the user signal wherein the record is cleared from the memory when the user signal is cleared.

9. The mobile electronic device of claim 7 further comprising a screen adapted to display an image corresponding to the user signal wherein the image is cleared from the screen in response to clearance of the user signal.

10. The mobile electronic device of claim 7 further comprising a display that is adapted to display characters corresponding to the consecutively generated user signals, and wherein the processing device is adapted to clear the sequence of identical user signals from the display.

11. A method of limiting inadvertent use of a mobile electronic device, the method comprising:
generating a signal in response to receipt of a manual entry wherein a long duration manual entry results in generating a plurality of signals;
applying a most recently generated signal to a most recent data entry;
measuring a time lapse since receipt of the manual entry associated with the most recently generated signal during which no subsequent signal is generated;
comparing the time lapse to a first timeout period;
clearing the most recent data entry in response to the time lapse exceeding the first timeout period;
measuring a second time lapse since clearing the most recent data entry during which a user signal is not generated;
comparing the second time lapse to a second timeout period; and
clearing an earlier data entry in response to the second time lapse exceeding the second timeout period.

12. The method of claim 11 wherein the data entries are a sequence of data entries.

13. The method of claim 12 wherein the sequence of data entries comprises a sequence of identical data entries.

14. The method of claim 11 wherein clearing the earlier data entry in response to the second time lapse exceeding the second timeout period comprises clearing a data entry that is the same as the most recent data entry.

15. The method of claim 11 further comprising storing a record corresponding to the signal and clearing the record when the data entry is cleared.

16. The method of claim 11 further comprising displaying an image corresponding to the data entry and clearing the image in response to clearance of the data entry.

17. The method of claim 16 further comprising displaying a warning message prior to clearing the data entry when the time lapse exceeds the first timeout period.

18. The method of claim 17 wherein displaying the warning message prior to clearing the image further comprises displaying a countdown.

19. The method of claim 11 further comprising adjusting at least one of the timeout periods in response to habitual use of the mobile electronic device.

20. A method of operating a mobile electronic device, the method comprising:
generating signals in response to receipt of manual entries;
collectively storing the signals in a memory;
determining whether the signals comprise a sequence of identical signals exceeding a predetermined number of identical signals; and
clearing the sequence of identical signals from a memory one signal at a time in response to the number of identical signals exceeding the predetermined number of identical signals, wherein clearing the sequence of identical signals begins with a most recently generated user signal before clearing an earlier-generated user signal.

21. The method of claim 20 further comprising storing a record corresponding to the signals and clearing the record when the signals are cleared.

22. The method of claim 20 further comprising displaying an image corresponding to the identical signals and clearing the image in response to clearing the identical signals.

23. The method of claim 22 further comprising displaying a warning message prior to clearing the image.

24. The method of claim 23 wherein displaying the warning message prior to clearing the image further comprises displaying a countdown.

25. A non-transitory computer-readable medium having instructions stored thereon, the instructions comprising:
instructions for generating and storing in memory a data entry in response to receipt of a manual entry from a user interface wherein a long duration manual entry results in generating a plurality of data entries;
instructions for measuring a time lapse since receipt of a most recent manual entry during which no subsequent data entry is generated;
instructions for comparing the time lapse to a first timeout period;
instructions for clearing a most recent data entry generated in response to the most recent manual entry from the memory in response to the time lapse exceeding the first timeout period;
instructions for measuring a second time lapse since clearing the most recent data entry during which a data entry is not generated;
instructions for comparing the second time lapse to a second timeout period; and
instructions for clearing a data entry generated before the most-recent data entry in response to the second time lapse exceeding the second timeout period.

26. The non-transitory computer-readable medium of claim 25 further comprising instructions for storing a record corresponding to the data entry and clearing the record when the data entry is cleared.

27. The non-transitory computer-readable medium of claim 25 further comprising instructions for displaying an image corresponding to the data entry and clearing the image in response to clearance of the data entry.

28. The non-transitory computer-readable medium of claim 27 further comprising instructions for displaying a warning message prior to clearing the image.

29. The non-transitory computer-readable medium of claim 28 further comprising instructions for displaying a countdown.

30. The non-transitory computer-readable medium of claim 25 further comprising instructions for adjusting at least one of the timeout periods in response to habitual use of the mobile electronic device.

31. A non-transitory computer-readable medium having computer readable instructions stored thereon, the instructions comprising:
  instructions for generating and collectively storing in a memory signals in response to receipt of manual entries from a user interface;
  instructions for determining whether the signals comprise a sequence of identical signals exceeding a predetermined number of identical signals; and
  instructions for clearing the sequence of identical signals from the memory one signal at a time in response to the number of identical signals exceeding the predetermined number of identical signals, wherein clearing the sequence of identical signals begins with a most recently generated user signal before clearing an earlier-generated user signal.

32. The non-transitory computer-readable medium of claim 31 further comprising instructions for storing a record corresponding to the signals and clearing the record as the signals are cleared.

33. The non-transitory computer-readable medium of claim 31 further comprising instructions for displaying an image corresponding to the identical signals and clearing the image as the identical signals are cleared.

34. The non-transitory computer-readable medium of claim 33 further comprising instructions for displaying a warning message prior to clearing the image.

35. The non-transitory computer-readable medium of claim 34 further comprising instructions for displaying a countdown.

* * * * *

UNITED STATES PATENT AND TRADEMARK OFFICE
CERTIFICATE OF CORRECTION

| | | |
|---|---|---|
| PATENT NO. | : 7,924,268 B2 | |
| APPLICATION NO. | : 11/270972 | |
| DATED | : April 12, 2011 | |
| INVENTOR(S) | : Kavounas | |

It is certified that error appears in the above-identified patent and that said Letters Patent is hereby corrected as shown below:

Title page, item (73), under "Assignee", in Column 1, Line 2, delete "(US)" and insert
-- (US) 19904 --.

Column 9, line 16, in Claim 7, delete "earlier generated" and insert -- earlier-generated --.

Signed and Sealed this
Sixteenth Day of August, 2011

David J. Kappos
*Director of the United States Patent and Trademark Office*